United States Patent
Mahajan et al.

(10) Patent No.: US 6,618,358 B2
(45) Date of Patent: *Sep. 9, 2003

(54) METHOD AND APPARATUS FOR SWITCHING A CLOCK SOURCE FROM AMONG MULTIPLE T1/E1 LINES WITH USER DEFINED PRIORITY

(75) Inventors: Sanjeev A. Mahajan, Sunnyvale, CA (US); Venkaiah Dukkipati, Cupertino, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,469

(22) Filed: Sep. 24, 1998

(65) Prior Publication Data

US 2003/0076851 A1 Apr. 24, 2003

(51) Int. Cl.⁷ .............................. H04L 12/26; H04J 3/14
(52) U.S. Cl. ...................... 370/242; 370/241; 370/243; 370/244; 370/246; 370/250; 375/356; 375/357; 375/359; 379/1.01
(58) Field of Search ................................ 370/244, 241, 370/242, 243, 246, 250; 375/356, 357, 359; 709/248; 714/100, 1, 48, 798; 379/1.01, 1.03, 22; 455/357, 359

(56) References Cited

U.S. PATENT DOCUMENTS

| 5,059,925 | A | | 10/1991 | Weisbloom |
| 5,946,300 | A | * | 8/1999 | Wilbrod ...................... 370/241 |
| 6,014,414 | A | * | 1/2000 | Yamamoto et al. ......... 375/356 |
| 6,169,753 | B1 | * | 1/2001 | Yoshida ....................... 370/507 |

OTHER PUBLICATIONS

*MT9042B Multitrunk System Synchronizer Preliminary Information* by Mitel Semiconductor, Oct. 1996, Issue 1, pp. 3–97, through 3–121.
*CMOS ST–BUS™ Family MT90820 Large Digital Switch* by Mitel Semiconductor, Apr. 1998, Issue 5, pp. 2–201 through 2–229.
*Bt8370 Fully Integrated T1/E1 Framer and Line Interface*, Network Access Products by Rockwell Semiconductor Systems, consisting of 5 unnumbered pages, pp. v–xviii, pp. 1–285, 4 unnumbered pages.

\* cited by examiner

*Primary Examiner*—Hassan Kizou
*Assistant Examiner*—Joe Logsdon
(74) *Attorney, Agent, or Firm*—Marger Johnson & McCollom, PC

(57) ABSTRACT

A clock selection controller is shown which allows a user to assign a priority scheme to recovered clock signals obtained from communication facilities. The clock selection controller also receives a plurality of alarm signals corresponding to the communications facilities for each of the recovered clock signals. The clock selection controller then automatically selects, for output as a reference clock signal, the highest priority clock input available for which the corresponding alarm signals are inactive. In the absence of an available clock input in the priority scheme, the processor selects a free running clock input.

24 Claims, 3 Drawing Sheets

METHOD AND APPARATUS FOR SWITCHING A CLOCK SOURCE FROM AMONG MULTIPLE T1/E1 LINES WITH USER DEFINED PRIORITY

FIELD OF THE INVENTION

The present invention relates generally to automatic selection of a T1/E1 transmission line for use as a data clock source.

BACKGROUND OF THE INVENTION

An internet Network Access Server (NAS) provides dial-up services to users over multiple T1/E1 transmission lines in a Public Services Telephone Network (PSTN). A user dials into the access server in order to be connected to the internet.

The access server transmits and receives data through the public telephone service over the T1/E1 transmission lines. Each T1/E1 line is clocked by a telephone switching system in the PSTN. The data is clocked internally to various modules within the access server where the data is analyzed and routed. If an independent operating clock inside the access server is used to clock the data within the access server, then the internal clock will likely be out of phase with the incoming data. In order to synchronize the data with the internal access server clock, the data must be buffered resulting in additional hardware requirements for the access server.

Internal buffering can be avoided by using a recovered clock extracted from an incoming T1/E1 line to drive the internal data bus of the access server. This allows the data to be clocked internally at the same speed as the incoming data thus negating the need for additional buffering hardware.

Where there are multiple T1/E1 lines coming into the access server, it is necessary to select one of the T1/E1 clock lines to use as the source for internal clocking inside the access server.

An example of a conventional device for switching between two T1/E1 clock lines is shown in FIG. 1. A T1 line terminates on each of line interface controllers 10 and 20. Each line interface controller recovers a clock signal CLK from the incoming data on the corresponding T1 line. Each line interface controller also generates a Loss-of-Signal (LOS) alarm LOS which becomes active when the line interface controller detects loss of the incoming analog signal. LOS typically becomes active after 100 contiguous zeros are received. An example of a line interface controller is the BT8370 from Rockwell.

The recovered clock signal from line interface 10 is input to demultiplexor (DMUX) 34 of clock selection controller 30 as the primary clock PRI. The recovered clock signal from line interface 20 is input to DMUX 34 as the secondary clock SEC. DMUX 34 also receives an oscillator signal OSC which provides a free running clock signal which is not synchronized to either the primary or secondary T1 lines. DMUX 34 selects one of the primary PRI, secondary SEC or free running oscillator OSC inputs for output as a SELECTED CLK signal under control of a SELECTION CONTROL signal. The SELECTED CLK can be input to a data switch, such as a time division multiplexed (TDM) switch, for use as a data transfer clock. The MT90820 from Mitel is an example of a TDM switch.

The SELECTION CONTROL signal is generated by automatic/manual state machine 32 of clock selection controller 30. The automatic/manual state machine 32 receives LOS1 from line interface controller 10 and LOS2 from line interface controller 20. The automatic/manual state machine 32 also receives a MANUAL SELECT input signal by which a user can determine whether the state machine operates in either manual or automatic mode. When in manual mode, the user, by way of commands input via a RSEL input, can select the primary PRI or secondary SEC clock sources and the automatic/manual state machine 32 will generate the SELECTION CONTROL signal accordingly. The user can also select the free run OSC clock source by inputting a particular value for the MANUAL SELECT input signal.

In the automatic mode, the automatic/manual state machine 32 selects the primary PRI, secondary SEC or free run OSC clock sources based upon the state of the LOS1 and LOS2 signals. Normally, if LOS1 is inactive, then the state machine will select the primary clock source PRI and generate the SELECTION CONTROL signal accordingly so that the recovered clock signal obtained from the T1 line terminating on line interface controller 10 is switched through DMUX 34 to the SELECTED CLK output. However, if LOS1 becomes active, then line interface controller 10 has lost the T1 signal and, responsive thereto, the state machine selects the secondary clock source SEC recovered by line interface controller 20 for output as the SELECTED CLK. If LOS1 and LOS2 are both active, line interface controllers 10 and 20 have both lost their T1 signals. The state machine 32 will then switch to the free running OSC clock source.

When either of the loss-of-signals LOS1 and LOS2 clear, then the state machine 32 detects the change of status on the T1 line and switches to the primary clock source PRI, if LOS1 clears, or to the second clock source SEC, if LOS2 clears but LOS1 remains active. The primary PRI clock is given the highest priority for selection followed by the secondary SEC clock and, finally, the free running OSC clock.

The priority of the clock signals input to the clock selection controller 30 is determined by the physical connection to the clock selection controller 30 circuit. The clock recovered from the T1 line terminating on line interface controller 10 is always given higher priority for clock selection purposes than the clock recovered from the T1 line terminating on line interface controller 20 by virtue of their physical connections to the controller circuit 30. Thus, the hardwired priority scheme of the T1 clocks are hardwired in the system of FIG. 1 and cannot be altered via user inputs except in the manual mode.

Also, the design of clock selection controller 30 only contemplates recovered clock signals from two T1 facilities. The explosion of demand for internet access has led to an increase in the bandwidth required by Network Access Servers (NAS) which is obtained by serving each NAS with a greater number of T1 facilities for data transfer.

Furthermore, the design of clock selection controller 30 can only monitor one alarm signal, LOS, for each T1 line. There are other T1 signals that can identify problems on a T1 line. Examples of other performance indicator signals are alarm-indication-signal (AIS), yellow alarm (YEL), lost frame alignment (FRED), excessive zeroes (EXZ), loss-of-frame (LOF), framing error (FERR), multi-frame error (MFERR) among others. Many of these alarm conditions can affect the quality of the clock signal recovered from the corresponding T1 facility. These performance monitoring signals for T1 lines are ignored in the controller of FIG. 1.

The MT9042B multi-trunk system synchronizer from Mitel is an example of the conventional clock selection controller 30 shown in FIG. 1.

Accordingly, a need remains for a clock selection controller that has increased failure detection capability and configurability and can also accommodate the increased number of T1 lines in NASs.

SUMMARY OF THE INVENTION

An embodiment of a clock selection controller, according to the present invention, has a plurality of clock inputs. Each one of the plurality of clock inputs is configured to receive a recovered clock signal from a line interface controller and a clock output configured to output an internal clock signal. The controller also has a first plurality of alarm inputs. Each one of the first plurality of alarm inputs corresponds to one of the plurality of clock inputs. Each one of the first plurality of alarm inputs are configured to receive a first alarm signal from the line interface controller providing the recovered clock signal to the corresponding one of the plurality of clock inputs. A user interface is configured to receive user configuration commands so that a user can determine a priority scheme among the plurality of clock inputs.

A clock signal switch is coupled to each of the plurality of clock inputs and the clock output. The clock signal switch is configured to receive a clock selection signal at a control input and switch the recovered clock signal from one of the plurality of clock inputs to the clock output. A clock selection processor is configured to receive the user configuration commands from the user interface, store the priority scheme and receive the first alarm signals from the first plurality of alarm inputs. The clock selection processor is configured to generate the clock selection signal according to one of the selected plurality of clock inputs having the highest priority and an inactive first alarm signal.

The clock source selection apparatus and a user interface includes a plurality of line interface controllers, each one of the plurality of line interface controllers. Each one of the line interface controllers is configured to receive a transmission line and extract a recovered clock signal and a first alarm signal from data received on the transmission line. The user interface is configured to receive user configuration commands.

The apparatus has a clock selection controller coupled to each one of the plurality of line interface controllers and coupled to the user interface. The clock selection controller is configured to maintain a priority scheme among the recovered clock signals of the plurality of line interface controllers. The priority scheme is configurable responsive to the user configuration commands received at the user interface.

The clock selection controller is further configured to automatically select one of the recovered clock signals. The clock signals range in order from a highest priority recovered clock signal to a lowest priority clock signal. The clock signal with the highest priority and an inactive alarm is used as a data clock source for a network access server.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 2:
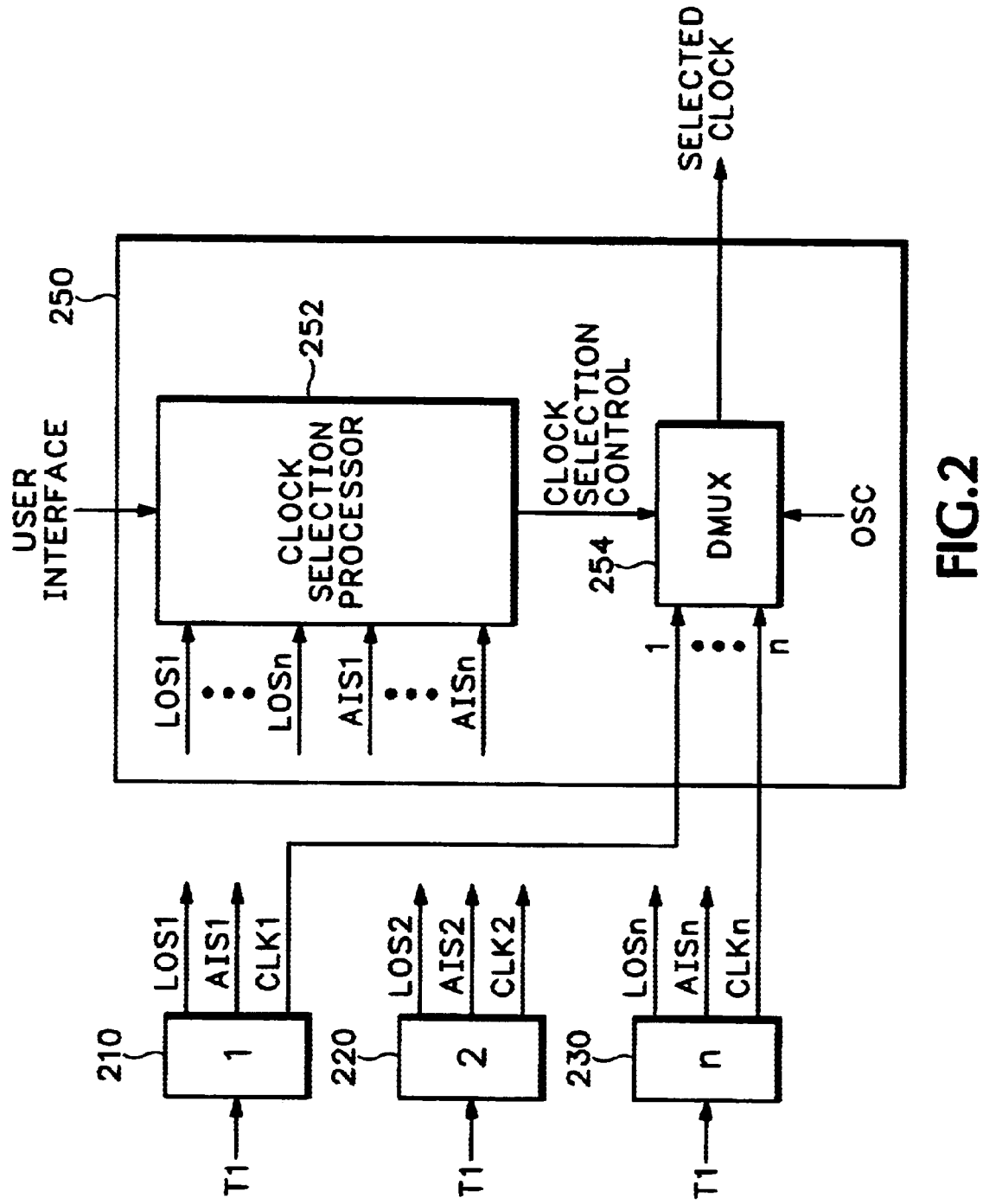
FIG. 2 is a functional block diagram of a clock selection controller according to the present invention connected to a plurality of line interface controllers.

Referring now to FIG. 2, an embodiment of a clock selection controller 250 according to the present invention is shown connected to 1, 2 . . . n multiple line interface controllers 210, 220 and 230.

The ellipses between line interface controllers 210, 220, and 230 in FIG. 2 indicate that the number of line interface controllers can range from the three shown up to n. Each line interface controller outputs a loss-of-signal alarm LOS1–LOSn, an alarm-indication signal AIS1–AISn, and a recovered clock signal CLK1–CLKn, respectively. The AIS signal is for purposes of example. Other performance monitoring signals can be substituted or combined with the AIS signal as the requirements of the particular design change.

The clock selection controller 250 has n clock inputs which are, in turn, connected to input terminals of a DMUX 254. Clock selection controller 250 also has a free run clock input OSC which is also connected to an input terminal of DMUX 254. DMUX 254 has an output terminal connected to a SELECTED CLK output of clock selection controller 250. The DMUX 254 selects any one of the n clock inputs and the OSC input as the SELECTED CLK output under the control of a CLOCK SELECTION CONTROL signal.

Figure 1:
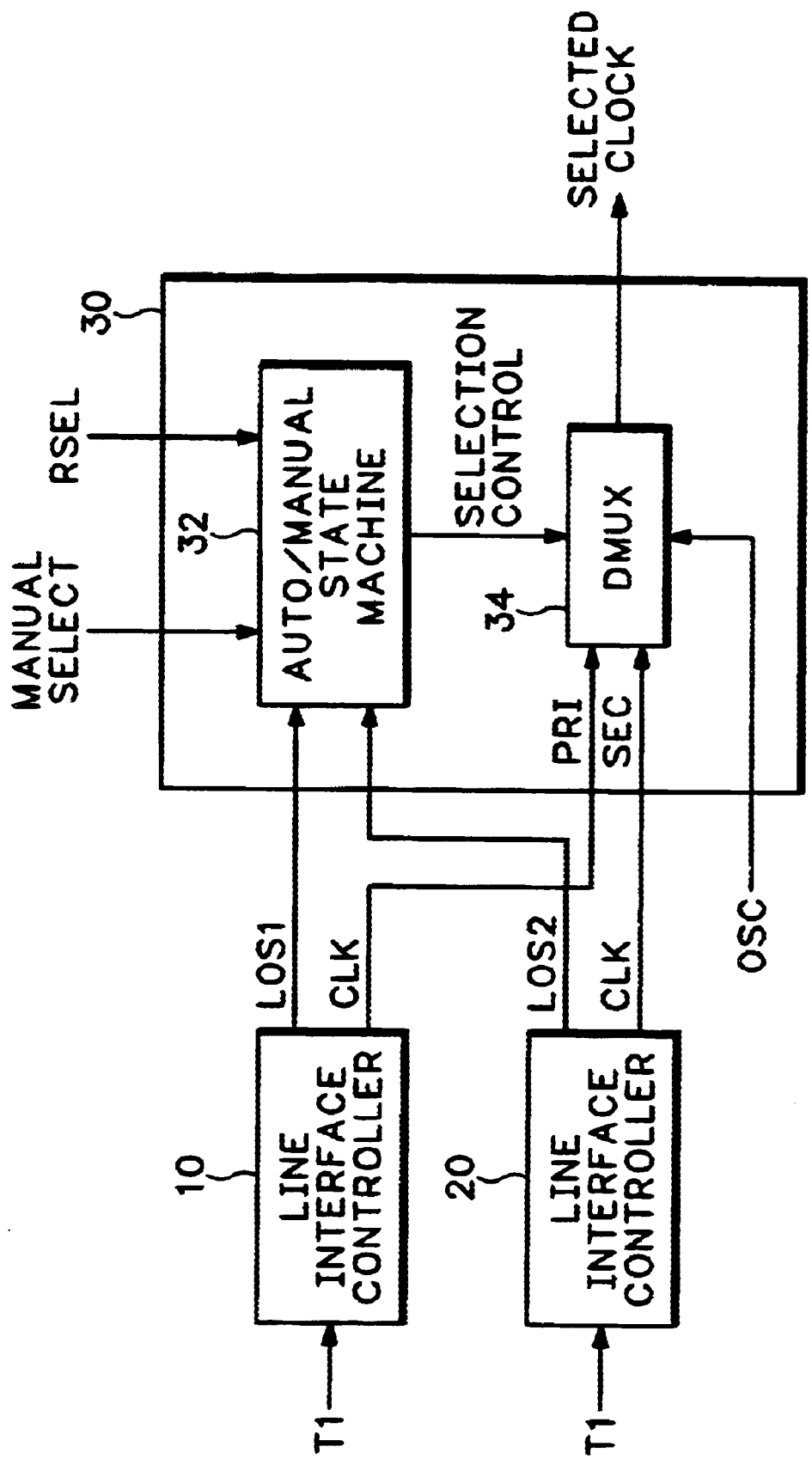
FIG. 1 is a prior art functional block diagram of a conventional clock selection controller connected to two line interface controllers.

The CLOCK SELECTION CONTROL signal is generated by a clock selection processor 252. The clock selection processor has n LOS input terminals for receiving LOS alarms from the line interface controllers. In FIG. 1, the LOS signals LOS1-LOSn from the n line interface controllers 210, 220, . . . 230, respectively, are connected to the n LOS input terminals of the clock selection processor 252. Similarly, the clock selection processor 252 receives n AIS alarms which are connected to the AIS signals AIS1-AISn from line interface controllers 210, 220, . . . 230.

The clock selection processor 252 is connected to a USER INTERFACE signal which is external to the clock selection controller 250. The clock selection processor 252 is configured to receive user configuration commands, such as command line interface (CLI) commands, via the USER INTERFACE. By inputting user configuration commands, the user is able to determine a priority scheme among the n clock inputs to the clock selection controller 250 ranging from a highest priority clock input to a lowest priority clock input. Clock inputs are assigned a position in the priority scheme which is independent of their physical connection to the clock selection controller 250. By not assigning a clock input to the priority scheme, clock inputs can be excluded from selection by the clock selection processor 252.

The clock selection processor 252 operates by generating the CLOCK SELECTION CONTROL signal according to the highest clock in the priority scheme with inactive LOS and AIS signals. If there are no clock inputs assigned to the priority scheme or if the LOS and AIS signals are active for all the clock inputs in the priority scheme, the processor 252 selects the free running clock input OSC.

When an event takes place that makes a clock input available for selection by the clock selection processor 252, the processor evaluates whether to select the newly available clock. If the priority level assigned to the newly available clock input is lower than the priority level assigned to the currently selected clock, then the selected clock is not changed. If either the LOS or AIS signal corresponding to a higher priority clock input clears, the processor 252 waits a predetermined period of time to ensure the alarm signals remain clear. This introduces some hysteresis to the system in order to reduce the number of clock switches that occur from unstable clock inputs. If the LOS and AIS signals for the newly available clock remain inactive for the predetermined hysteresis period and the newly available clock has a higher priority level than the currently selected clock, the processor 252 generates a new CLOCK SELECTiON CONTROL signal in order to select the newly available clock input as the SELECTED CLOCK output from DMUX 254.

In addition, user inputs can precipitate a change in the selected clock. If a CLI command is received which reassigns the priority levels of the clock inputs such that a clock input is available which has a higher priority level than the priority level of the currently selected clock input, then the processor 252 generates the CLOCK SELECTION CONTROL signal to select the newly available clock input. Also, if a clock input was removed from service in response to a CLI command and another CLI command is received that puts the clock input back into service, then that clock input will be selected by the processor 252 if it is the highest priority clock available.

Figure 3:
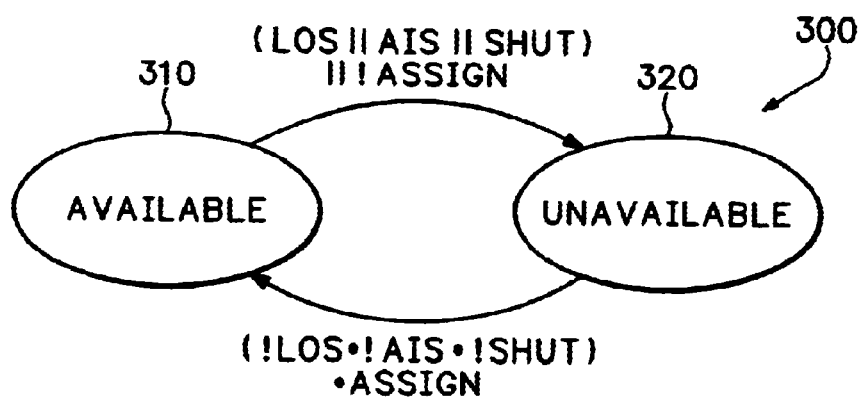
FIG. 3 is a state diagram for the clock inputs to the clock selection processor of FIG. 2.

FIG. 3 illustrates an embodiment of a finite state machine 300 implemented in the clock selection processor 252 for each of the n clock inputs to the clock selection controller 250. Each of the n clock inputs is in either an available state 310 or an unavailable state 320. Each clock input is initialized in the unavailable state 320. In order for the clock input to transition to the available state 310, the LOS and AIS signals for the clock input must be inactive, the clock input must not have been shutdown by the user via input of a CLI command, and the clock input must be assigned a position within the priority scheme. This set of conditions is represented by the arc labeled (!LOS !AIS !shut assign) in FIG. 3. All other conditions result in the clock input remaining in the unavailable state 320.

When the clock input is in the available state 310, if either the LOS or AIS signals become active, the clock input is shutdown via a CLI command, or the clock input is removed from the priority scheme via a CLI command, then clock input will transition to the unavailable state 320. This transition is represented by the arc labeled (LOS||AIS||shut||!assign).

Figure 4:
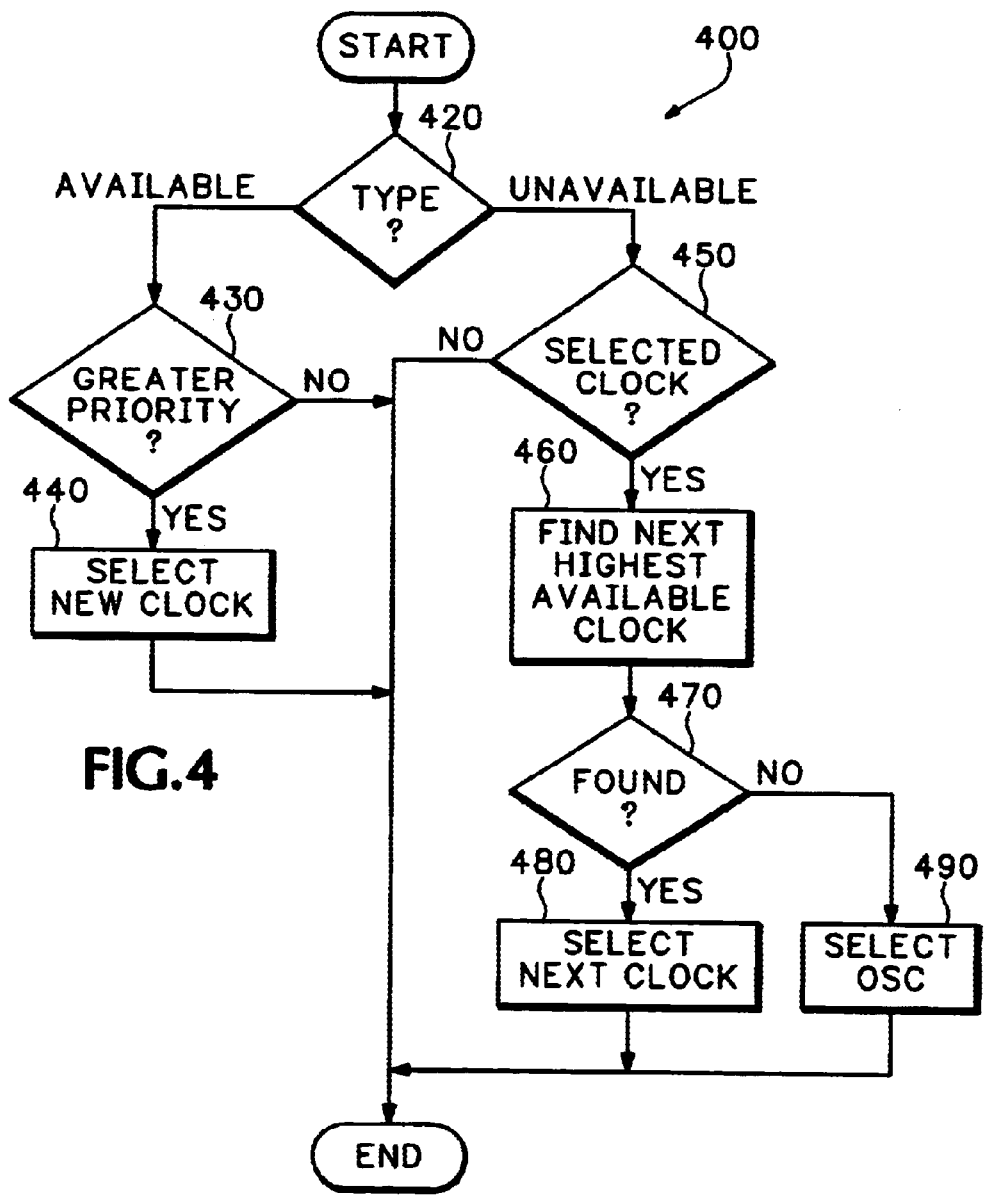
FIG. 4 is a flow diagram showing how the clock selection processor of FIG. 2 operates.

When one of the clock inputs changes state in the finite state machine 300 shown in FIG. 3, then the clock selection processor 252 will perform the process 400 illustrated in FIG. 4. The process branches at step 420 based upon whether the new state of the clock input is AVAILABLE or UNAVAILABLE.

If the state is AVAILABLE, then, at step 430, the priority level of the newly available clock input is checked to see if it is greater than the priority level of the currently selected clock. If not, then no further processing is necessary and the process terminates. If the newly available clock is greater, the newly available clock is selected and the clock selection processor 252 generates the CLOCK SELECTION CONTROL signal such that the DMUX 254 routes the clock signal received at the clock input to the SELECTED CLOCK output of the clock selection controller 250.

If the state is UNAVAILABLE, then, at step 450, the newly unavailable clock is checked to see if it is the selected clock. If it is not, then no further processing is necessary and the process terminates. If the newly unavailable clock is the selected clock, then the clock selection processor 252 searches the priority scheme, at step 460, for the highest priority clock input that is in the available state. If such a clock input is found in the priority scheme, then it is selected and the clock selection processor 252 generates the CLOCK SELECTION CONTROL signal accordingly. If no such clock is found, then the clock selection processor 252 selects the free running clock input OSC and generates the CLOCK SELECTION CONTROL signal accordingly.

The clock selection controller according to the present invention permits the selection of any number of clock inputs for use as an internal data clock using a user determined priority scheme. This allows a user to assign a hierarchy to the clock inputs that are potential reference clock sources based upon the relative quality of the clock signal from a number of line interface controllers. For example, statistical or empirical data on the performance and stability of the T1 lines terminating on each of the line interface controllers can be incorporated by the user into the priority scheme for clock input selection in the clock selection controller.

In addition, the controller according to the present invention is able to automatically select one of the clock inputs assigned to the priority scheme using multiple different alarm signal inputs corresponding to the clock input. While the additional signal shown in FIG. 2 is represented as the AIS signal, any performance monitoring alarm signal can be utilized in the clock selection algorithm performed by the clock selection controller of the present invention.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A clock selection controller, the controller comprising:
a plurality of clock inputs, each configured to receive a clock signal from a line interface controller;
a clock output configured to output an internal clock signal;
a first plurality of alarm inputs each corresponding to one of the plurality of clock inputs and configured to receive a first alarm signal from the line interface controller;
a clock signal switch coupled to each of the plurality of clock inputs and the clock output, the clock signal switch configured to receive a clock selection signal at a control input and, responsive thereto, switch the clock signal from one of the plurality of clock inputs to the clock output;
a user interface configured to receive user configuration commands for selecting different user configurable priority schemes each identifying different orders of priority for the plurality of clock inputs independently of physical connections of the clock inputs on the clock signal switch; and
a clock selection processor configured to identify when the clock input currently used as the clock output has an active alarm and then automatically and without manual user selection selecting a next one of the multiple clock inputs having an inactive alarm signal and a highest priority according to the user configured priority schemes, the clock selection processor further configured to automatically generate the clock selection signal for configuring the clock signal switch to output the selected next one of the multiple clock inputs.

2. The clock selection controller of claim 1, wherein the clock selection processor further selects only those ones of the plurality of clock inputs assigned a position in the priority scheme.

3. The clock selection controller of claim 2, wherein the clock signal switch further includes a free running clock input configured to receive a free running clock signal and where the clock selection processor is further configured to generate the clock selection signal so as to select the free running clock input when the corresponding first alarm signals are active for all the clock inputs in the priority scheme.

4. The clock selection controller of claim 1, wherein the clock signal switch further includes a free running clock input configured to receive a free running clock signal and where the clock selection processor is further configured to generate the clock selection signal so as to select the free running clock input when the corresponding alarm signals are active for all the clock inputs in the priority scheme.

5. The clock selection controller of claim 4, wherein the clock selection processor, responsive to one of first and second different alarm signals becoming active for the selected recovered clock or responsive to one of the user configuration commands removing the selected recovered clock from the priority scheme, is further configured to generate the clock selection signal so as to select another one of the plurality of clock inputs having the highest priority for which the corresponding first and second alarm signals are inactive.

6. The clock selection controller of claim 5, wherein the first alarm signal is a Loss of Signal (LOS) alarm and the second alarm signal is an Alarm Indication Signal (AIS).

7. A method for selecting an internal clock source from among a plurality of clock signals recovered from a plurality of incoming transmission lines, the method comprising:

assigning a programmable priority scheme to the clock signals from the plurality of incoming transmission lines, the programmable priority scheme providing a programmable priority order for automatically selecting one of the plurality of clock signals;

automatically selecting a first one of the plurality of clock signals as the internal clock source having a highest priority in the programmable priority scheme;

monitoring up to k alarm signals from each of the plurality of incoming transmission lines, where each group of k alarm signals corresponds to the clock signal from the incoming transmission line;

placing each clock signal in an available state when each of the corresponding k alarm signals is inactive;

placing each recovered clock signal in an unavailable state when any of the corresponding k alarm signals are active;

automatically identifying when the first one of the clock signals is placed in the unavailable state; and automatically and without user intervention selecting a second one of the clock signals in the available state having a next highest priority in the programmable priority scheme as the internal clock source.

8. The method of claim 7, including selecting a free running clock as the internal clock source when all the recovered clock signals are in the unavailable state.

9. The method of claim 7, wherein the step of assigning a priority scheme to the recovered clock signals from the plurality of incoming transmission lines includes:

receiving user configuration commands; and determining the priority scheme based upon the user configuration commands.

10. The method of claim 9, further including the step of initializing each recovered clock signal in the unavailable state.

11. The method of claim 10, further including the step of placing each recovered clock signal in the unavailable state when it is removed from the priority scheme responsive to one of the user configuration commands.

12. The method of claim 11, wherein the step of selecting as the internal clock source the recovered clock signal in the available state having the highest priority in the priority scheme includes selecting another recovered clock signal as the internal clock source when the selected recovered clock is placed in the unavailable state.

13. A clock source selection system for a network access server, the system comprising:

a plurality of line interface controllers each configured to generate a clock signal and k different alarm signals from data received on a transmission line;

a user interface configured to receive user configuration commands;

a clock selection controller coupled to each one of the plurality of line interface controllers and the user interface, the clock selection controller maintaining a configurable and programmable priority scheme among the clock signals responsive to the user configuration commands and independently of physical interfaces on the clock selection controller receiving the line interface controllers and automatically selecting a first one of the clock signals according to the configurable priority scheme and automatically selecting a second one of the clock signals having a second highest priority in the configurable priority scheme when the first one of the clock signals has at least one active alarm signal, the clock selection controller automatically reselecting the first one of the clock signals when the alarm signals for the first one of the clock signals are no longer active.

14. The apparatus of claim 13, wherein the clock selection controller further includes a free running clock input configured to receive a free running clock signal, the clock selection controller being further configured to select the free running clock input when any one or more of the k alarm signals corresponding to each recovered clock signal is active for all the recovered clock signals in the priority scheme.

15. The apparatus of claim 13, wherein:

the clock selection controller, responsive to one of the k alarm signals corresponding to the currently selected recovered clock signal becoming active, is further configured to automatically select another one of the recovered clock signals, ranging in order from a highest priority recovered clock signal of the priority scheme to a lowest priority clock signal of the priority scheme, as the data clock source based upon all k alarm signals corresponding to said other recovered clock signal being in an inactive state.

16. The apparatus of claim 13, wherein:

the clock selection controller is further configured to automatically select another one of the recovered clock signals, ranging in order from a highest priority recovered clock signal of the priority scheme to a lowest priority clock signal of the priority scheme, as the data clock source when all k alarm signals corresponding to said other recovered clock signal are inactive and said other recovered clock signal is of higher priority than the currently selected clock signal.

17. A clock source selection system for a network access server, the system comprising:

means for generating a plurality of clock signals and k multiple different alarm signals for each clock signal from data received on a transmission line;

means for receiving user configuration commands;

means for maintaining a programmable priority scheme among the clock signals responsive to the user configuration commands independent of physical connections receiving the clock signals;

means for automatically selecting a first one of the clock signals according to the programmable priority scheme;

means for automatically monitoring the k multiple different alarm signals for each clock signal;

means for automatically selecting a second one of the clock signals having a next highest priority in the programmable priority scheme when any one of the k different alarm signals for the first one of the clocks signals is active;

means for reprogramming the priority scheme; and means for automatically selecting a third one of the clock signals having a new highest priority in the reprogrammed priority scheme when any one of the k different alarm signals for the second one of the clocks signals is active.

18. The clock source selection system of claim 17, wherein the system further comprises:

means for receiving a free running clock signal, and means for selecting the free running clock signal when any one or more of the k alarm signals corresponding to each recovered clock signal is active for all the recovered clock signals in the priority scheme.

19. The clock source selection system of claim 17, wherein the system further comprises:

means for automatically selecting another one of the recovered clock signals as the data clock source, ranging in order from a highest priority recovered clock signal to a lowest priority recovered clock signal of the priority scheme, based upon all k alarm signals corresponding to said other recovered clock signal being in an inactive state and in response to one of the k alarm signals corresponding to the currently selected recovered clock signal becoming active.

20. The clock source selection system of claim 17, wherein the system further comprises:

means for selecting another one of the recovered clock signals as the data clock source, ranging in order from a highest priority recovered clock signal to a lowest priority recovered clock signal of the priority scheme, when all k alarm signals corresponding to said other recovered clock signal are inactive and said other recovered clock signal is of higher priority than the currently selected clock signal.

21. A computer-readable medium, which, when read, causes a clock source selection system for a network access server to perform functions comprising:

generating a plurality of clock signals and k different alarm signals for each clock signal from data received on a transmission line;

receiving user configuration commands;

programming a configurable priority scheme among the clock signals responsive to the user configuration commands and automatically selecting a first one of the clock signals according to the configurable priority scheme;

automatically monitoring the different alarm signals and automatically selecting a second one of the clock signals having a next highest priority in the priority scheme when any of the alarm signals for the first one of the clock signals is active;

reprogramming the configurable priority scheme among the clock signals responsive to the user configuration commands and automatically selecting a third one of the clock signals according to the reprogrammed priority scheme; and automatically monitoring the different alarm signals and automatically selecting a fourth one of the clock signals having a next highest priority in the reprogrammed priority scheme when any of the alarm signals for the third one of the clock signals is active.

22. The computer-readable medium of claim 21, which, when read, causes the clock source selection system to perform functions further comprising:

receiving a free running clock signal and selecting the free running clock signal when any one or more of the k alarm signals corresponding to each recovered clock signal is active for all the recovered clock signals in the priority scheme.

23. The computer-readable medium of claim 21, which, when read, causes the clock source selection system to perform functions further comprising:

automatically selecting another one of the recovered clock signals as the data clock source, ranging in order from a highest priority recovered clock signal to a lowest priority recovered clock signal of the priority scheme, based upon all k alarm signals corresponding to said other recovered clock signal being in an inactive state and in response to one of the k alarm signals corresponding to the currently selected recovered clock signal becoming active.

24. The computer-readable medium of claim 21, which, when read, causes the clock source selection system to perform functions further comprising:

selecting another one of the recovered clock signals as the data clock source, ranging in order from a highest priority recovered clock signal to a lowest priority recovered clock signal of the priority scheme, when all k alarm signals corresponding to said other recovered clock signal are inactive and said other recovered clock signal is of higher priority than the currently selected clock signal.

* * * * *

UNITED STATES PATENT AND TRADEMARK OFFICE
CERTIFICATE OF CORRECTION

PATENT NO. : 6,618,358 B2
DATED : September 9, 2003
INVENTOR(S) : Mahajan et al.

It is certified that error appears in the above-identified patent and that said Letters Patent is hereby corrected as shown below:

<u>Title page,</u>
Item [56], References Cited, OTHER PUBLICATIONS, "Oct. 1996, Issue 1, pp.3-97, through 3-121." should read -- Oct. 1996, Issue 1, pp.3-97 through 3-121. --.

<u>Column 4,</u>
Line 20, "signal AISI-AISn," should read -- signal AIS1-AISn, --.

<u>Column 5,</u>
Line 13, "CLOCK SELECTiON" should read -- CLOCK SELECTION --.

Signed and Sealed this

Twenty-second Day of June, 2004

JON W. DUDAS
*Acting Director of the United States Patent and Trademark Office*